US011174904B2

(12) United States Patent
Kim et al.

(10) Patent No.: US 11,174,904 B2
(45) Date of Patent: Nov. 16, 2021

(54) FIELD CORE UNIT FOR ELECTROMAGNETIC CLUTCH

(71) Applicants: Hyundai Motor Company, Seoul (KR); Kia Motors Corporation, Seoul (KR)

(72) Inventors: Shin Gyu Kim, Gyeonggi-do (KR); Hyung Suk Kim, Seoul (KR); Young Min Kim, Gyeonggi-do (KR); Sung Taeg Oh, Daejeon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 124 days.

(21) Appl. No.: 16/003,749

(22) Filed: Jun. 8, 2018

(65) Prior Publication Data

US 2019/0195294 A1 Jun. 27, 2019

(30) Foreign Application Priority Data

Dec. 21, 2017 (KR) .................... 10-2017-0176800

(51) Int. Cl.
| | |
|---|---|
| *F16D 27/14* | (2006.01) |
| *F16D 27/112* | (2006.01) |
| *F16D 27/06* | (2006.01) |
| *H01F 5/02* | (2006.01) |
| *H01F 7/08* | (2006.01) |
| *H01F 3/10* | (2006.01) |
| *F16D 27/00* | (2006.01) |
| *H01F 7/06* | (2006.01) |
| *H01F 3/08* | (2006.01) |

(52) U.S. Cl.
CPC ............ *F16D 27/112* (2013.01); *F16D 27/06* (2013.01); *F16D 27/14* (2013.01); *H01F 3/10* (2013.01); *H01F 5/02* (2013.01); *H01F 7/081* (2013.01); *F16D 2027/001* (2013.01); *F16D 2027/005* (2013.01); *H01F 3/08* (2013.01); *H01F 2007/062* (2013.01)

(58) Field of Classification Search
CPC .......................................... F16D 27/06–27/14
See application file for complete search history.

(56) References Cited

U.S. PATENT DOCUMENTS

| | | | | |
|---|---|---|---|---|
| 4,413,717 A | * | 11/1983 | Kanamaru | .............. B21K 25/00 192/107 M |
| 5,156,754 A | * | 10/1992 | Nomura | .............. B29C 33/3807 249/134 |

(Continued)

FOREIGN PATENT DOCUMENTS

| | | |
|---|---|---|
| KR | 20100002620 A | 1/2010 |
| KR | 10-1261323 B1 | 5/2013 |
| KR | 10-1687559 B1 | 12/2016 |

*Primary Examiner* — David R Morris
*Assistant Examiner* — Lillian T Nguyen
(74) *Attorney, Agent, or Firm* — Mintz Levin Cohn Ferris Glovsky and Popeo, P.C.; Peter F. Corless (57) ABSTRACT

A field core unit for an electromagnetic clutch can include: a field coil generating a magnetic flux; a magnetic part provided with an annular-shaped insertion groove encompassing lower and side portions of the field coil such that the magnetic flux flows through the magnetic part; and a field core configured such that an upper surface thereof is open and an interior space is formed therein. The magnetic part can be inserted into the field core.

13 Claims, 11 Drawing Sheets

(56) References Cited

U.S. PATENT DOCUMENTS

| | | | | |
|---|---|---|---|---|
| 2009/0243773 | A1* | 10/2009 | Chung | H01F 5/02 |
| | | | | 335/282 |
| 2016/0238087 | A1* | 8/2016 | Miki | F16D 27/14 |
| 2016/0312840 | A1* | 10/2016 | Le | F16D 27/112 |
| 2017/0030420 | A1* | 2/2017 | Konishi | F16D 27/112 |
| 2017/0241489 | A1* | 8/2017 | Fukumura | F16D 27/02 |

* cited by examiner

FIG. 1

Prior Art

FIELD CORE UNIT FOR ELECTROMAGNETIC CLUTCH

CROSS REFERENCE TO RELATED APPLICATION

The present application claims the benefit of priority to Korean Patent Application No. 10-2017-0176800, filed on Dec. 21, 2017 in the Korean Patent Office, the entire contents of which are incorporated by reference as if fully set forth herein.

BACKGROUND

Technical Field

The present disclosure relates generally to a field core unit for an electromagnetic clutch. More particularly, the present disclosure relates to a field core unit for an electromagnetic clutch configured such that a magnetic paste is filled in a field core in which a field coil is accommodated, thus providing a strong attractive force.

Description of the Related Art

In general, an air conditioner of an automobile includes a compressor that is driven by engine power, and configured to compress a refrigerant supplied from an evaporator and send the compressed refrigerant to a condenser. The compressor is selectively driven by an intermittent action of an electromagnetic clutch.

Figure 1:
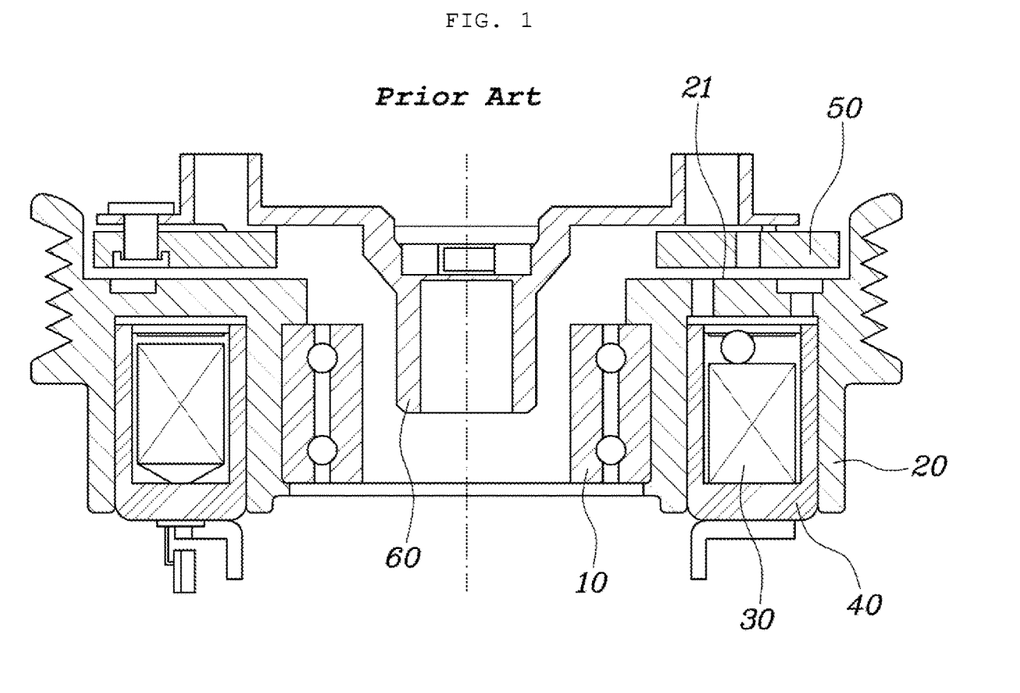
FIG. 1 is a cross-sectional view showing an electromagnetic clutch of a general compressor.

FIG. 1 is a cross-sectional view showing an electromagnetic clutch of a general compressor.

As shown in FIG. 1, the electromagnetic clutch is rotatably mounted on a bearing 10 fitted in a housing of a compressor. The electromagnetic clutch largely includes: a pulley 20 having a friction surface 21 and connected with a crankshaft of an engine via a drive belt (not shown); a field coil 30 embedded in the pulley 20 and accommodated in a field core 40 such that a magnetic flux is generated according to whether electric power may applied to the field coil 30; a disc 50 transferring a rotational force of the pulley 20 to a drive shaft (not shown) of the compressor by an attractive force with the friction surface 21 of the pulley 20 due to the magnetic flux generated in the field coil 30; and a hub 60.

The electromagnetic clutch having the above configuration is operated such that when the field coil 30 is applied with electric power, the disc 50 is attracted to the friction surface 21 due to the magnetic flux exerting an attractive force by magnetic induction. The disc 50 then transfers the rotational force of the pulley 20 to the drive shaft of the compressor via the hub 60.

Thereafter, when the electric power having been applied to the field coil 30 is cut off, the disc 50 is distanced from the friction surface 21 of the pulley 20. The power of the engine is then stopped from being transferred to the drive shaft of the compressor.

Conventionally, in order to increase an electromagnetic attractive force in the electromagnetic clutch, it is necessary to continuously increase the thickness of the field core 40 in which the field coil 30 is accommodated, which results in an increase in manufacturing cost and weight. In addition, since the thickness of the field core 40 is increased, it may be impossible to manufacture the field core by general press work. Rather, it must be manufactured by press forging, which increases manufacturing difficulty and cost.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art. The present disclosure provides a field core unit for an electromagnetic clutch, which is configured to improve a structure thereof to increase an attractive force, thus improving performance of the electromagnetic clutch while achieving weight reduction thereof.

Further, the present disclosure provides a field core unit for an electromagnetic clutch, which can guide flow of magnetic flux, thus minimizing leakage flux.

Further, the present disclosure provides a field core unit for an electromagnetic clutch, which is easy to manufacture. Thus, manufacturing cost can be reduced, and productivity can be improved.

It is to be understood that technical objects to be achieved by the present disclosure are not limited to the aforementioned technical objects, and other technical objects which are not mentioned will be apparent from the following description to the person with an ordinary skill in the art to which the present disclosure pertains.

According to embodiments of the present disclosure, a field core unit for an electromagnetic clutch can include: a field coil generating a magnetic flux; a magnetic part provided with an annular-shaped insertion groove encompassing lower and side portions of the field coil such that the magnetic flux flows through the magnetic part; and a field core configured such that an upper surface thereof is open and an interior space is formed therein. The magnetic part can be inserted into the field core.

The field coil may be formed in a donut-shape and may be configured such that a cross-sectional area thereof reduces in a downward direction.

The field coil may be further configured such that an inner diameter thereof increases in a height (e.g. downward) direction, while an outer diameter thereof remains constant in the height (e.g. downward) direction.

The magnetic part may be formed by molding a magnetic paste such that the magnetic flux flows through the magnetic part. The magnetic paste may be obtained by mixing iron-based metal powder and epoxy.

The magnetic part may be formed such that a filling rate of the magnetic paste increases in a downward direction.

Furthermore, the magnetic part may be configured such that an upper surface thereof is located lower than or on the same plane as an upper surface of the field coil.

The field core unit may further include a molded part inserted into the interior space of the field core so as to encompass and fix an upper portion of the field coil.

The molded part may be made of a resin or reinforced fiber-reinforced plastic.

According to embodiments of the present disclosure, by minimizing leakage flux, it is possible to improve performance of the manufactured field core unit for the electromagnetic clutch.

In addition, by reducing the thickness of the field core and inserting the magnetic part therein, it is possible to enable efficient flow of magnetic flux and to enable weight reduction of the manufactured field coil for the electromagnetic clutch.

Moreover, since the thickness of the field core can be reduced, it is possible to facilitate manufacturing thereof, thus reducing manufacturing cost and improving productivity.

Further provided are vehicles that comprise a field core unit and an electromagnetic clutch as disclosed herein.

Other aspects of the invention are disclosed infra.

BRIEF DESCRIPTION OF THE DRAWINGS

The above and other objects, features and other advantages of the present disclosure will be more clearly understood from the following detailed description when taken in conjunction with the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Hereinbelow, exemplary embodiments of the present disclosure will be described in detail with reference to the accompanying drawings. Wherever possible, the same reference numerals will be used throughout the drawings and the description to refer to the same or like elements or parts. In the following description, it is to be noted that, when the functions of conventional elements and the detailed description of elements related with the present disclosure may make the gist of the present disclosure unclear, a detailed description of those elements will be omitted.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Referring now to the presently disclosed embodiments, a magnetic part through which magnetic flux can flow is inserted into a field core into which a field coil is inserted so as to guide flow of magnetic flux. In addition, the thickness of the field core is reduced, thereby increasing an attractive force and achieving weight reduction.

Figure 2:
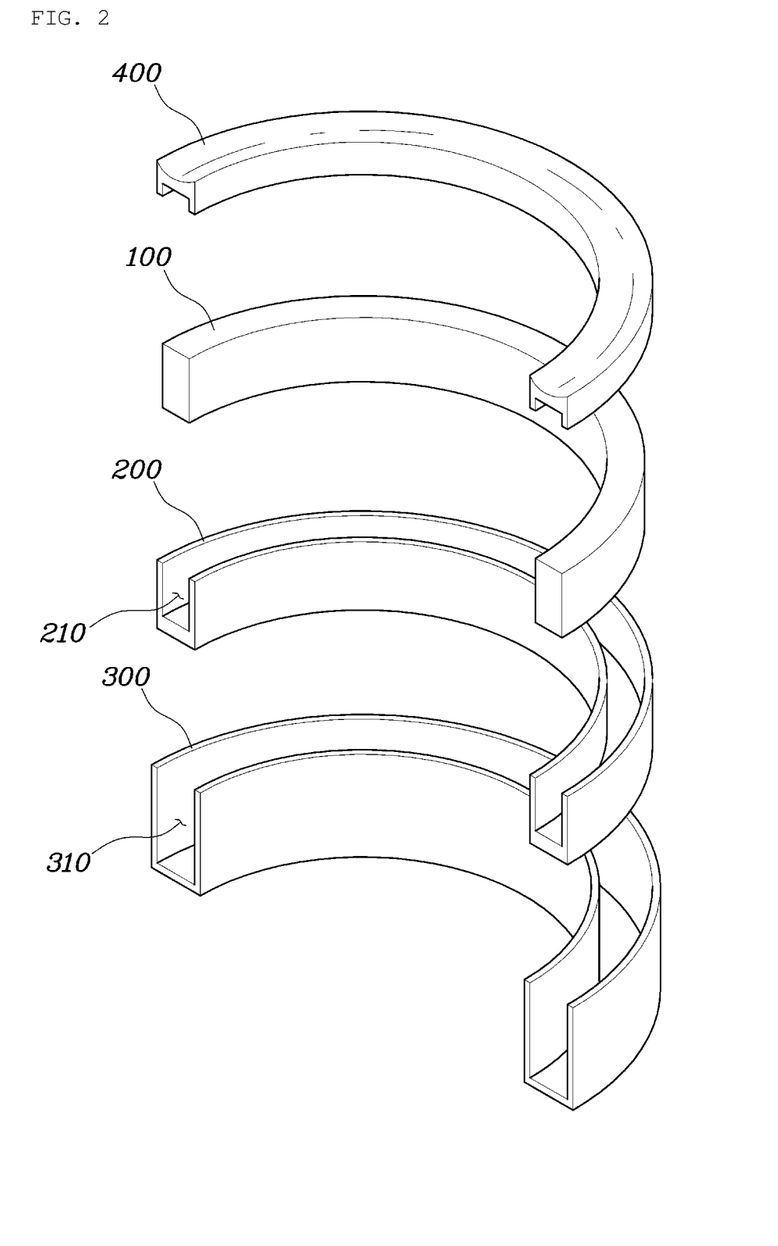
FIG. 2 is a view showing assembly of a field core unit for an electromagnetic clutch according to embodiments of the present disclosure.
Figure 3:
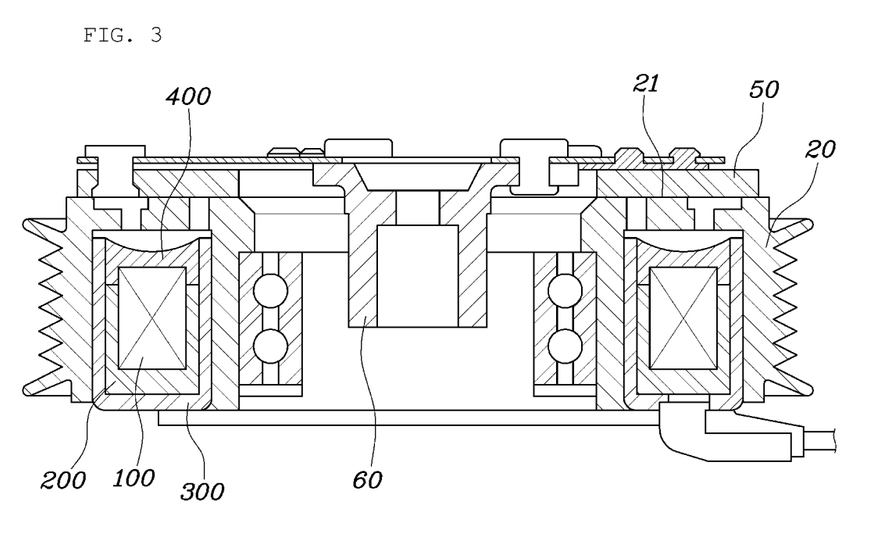
FIG. 3 is a cross-sectional view showing the electromagnetic clutch in which the field core unit for the electromagnetic clutch according to embodiments of the present disclosure is provided.

FIG. 2 is a view showing assembly of a field core unit for an electromagnetic clutch according to embodiments of the present disclosure, and FIG. 3 is a cross-sectional view showing the electromagnetic clutch in which the field core unit for the electromagnetic clutch according to embodiments of the present disclosure is provided.

As shown in FIGS. 2 and 3, the field core unit for the electromagnetic clutch according to embodiments of the present disclosure includes a field coil 100 for generating magnetic flux, a magnetic part 200 encompassing the field coil 100, and a field core 300 having therein an interior space 310. The magnetic part 200, into which the field coil 100 is inserted, is inserted into the interior space 310 of the field core 300.

The field coil 100 is provided in a hollow donut-like shape and is configured to generate magnetic flux when electric power is applied to the field coil 100, whereby when a disc 50 is allowed to be brought into contact with a friction surface 21 of a pulley 20 rotating and thus rotated, a rotational force of the pulley 20 is transferred to a drive shaft of a compressor.

The magnetic part 200 is formed so as to encompass side and lower portions of the field coil 100. The field core 300 is formed in a cylindrical or hollow cylindrical shape or polygonal shape, and is structured such that an upper surface thereof is open and the interior space 310 is formed therein such that the field coil 100 and the magnetic part 200 are inserted into the field core 300.

The magnetic part 200 according to embodiments of the present disclosure is formed in a donut shape, and includes an annular-shaped insertion groove 210 formed in a shape corresponding to the donut-shaped field coil 100 such that the field coil 100 is inserted into the insertion groove 210.

Herein, the magnetic part 200 is formed by molding a magnetic paste obtained by mixing iron-based metal powder and epoxy so as to provide an additional path through which magnetic flux flows. More preferably, the amount of the iron-based metal powder in the magnetic paste is greater than or equal to 70 wt % based on total weight of the magnetic paste such that efficient flow of magnetic flux is allowed. In certain aspects, preferably the amount of the iron-based metal powder in the magnetic paste is greater than or equal to 75, 80, 85, 90 or 95 wt % based on total weight of the magnetic paste.

Furthermore, the magnetic part 200 may be configured such that an upper surface thereof is located lower than or on the same plane as an upper surface of the field coil 100. This is because in a case where the upper surface of the magnetic part 200 is located higher than the upper surface of the field coil 100, leakage flux is generated, incurring a decrease in an attractive force of the field core unit for the electromagnetic clutch.

Figure 4:
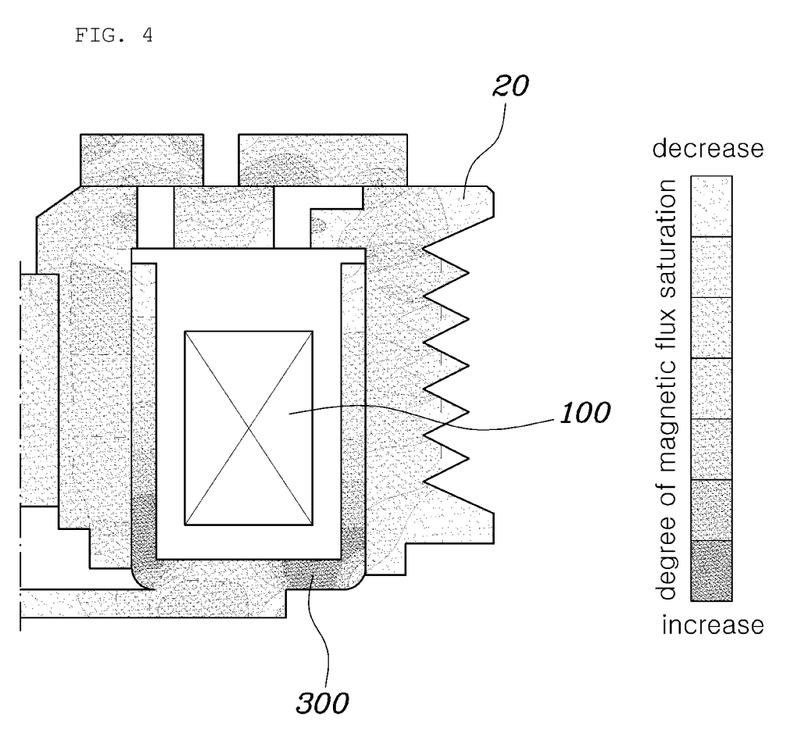
FIGS. 4 to 6 are views showing magnetic flux saturation according to embodiments and Comparative Examples in which the field core unit for the electromagnetic clutch according to the embodiment of the present disclosure is applied.
Figure 5:
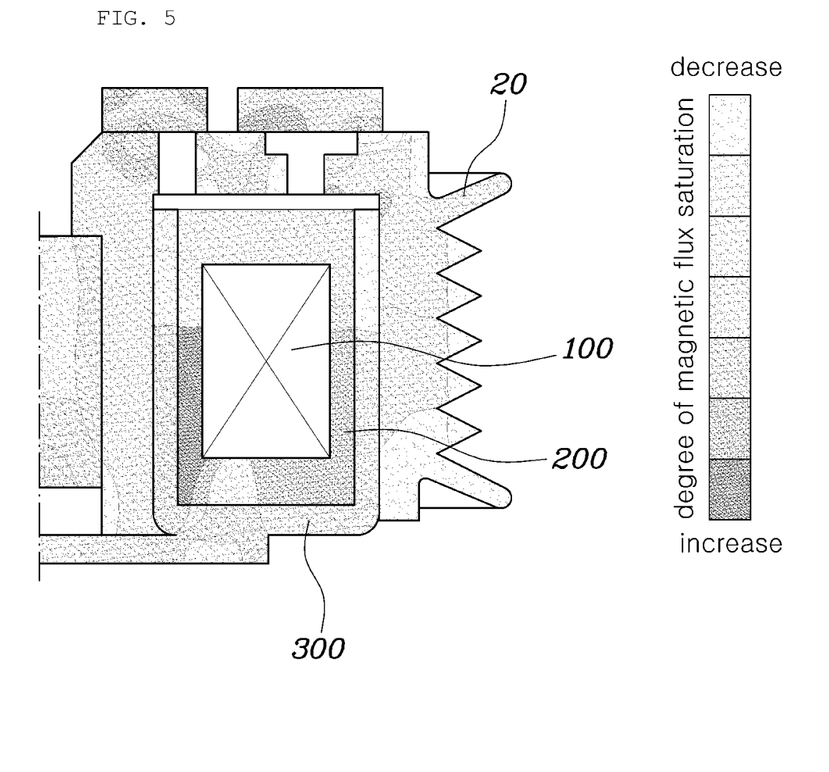
Figure 6:
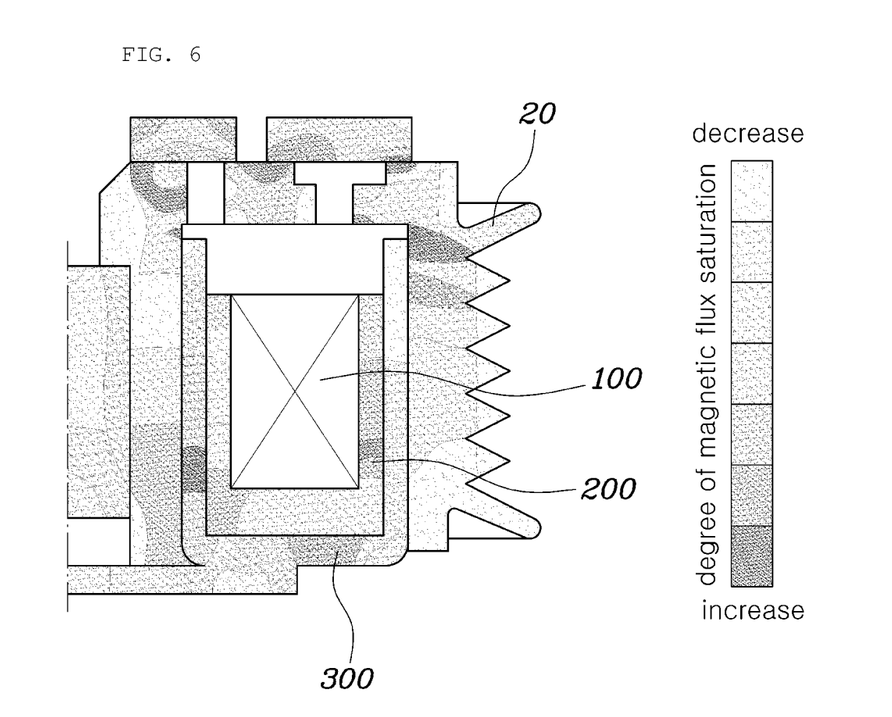

FIGS. 4 to 6 are views showing magnetic flux saturation according to Example and Comparative Examples in which the field core unit for the electromagnetic clutch according to embodiments of the present disclosure is applied.

More specifically, FIG. 4 is a Comparative Example 1 showing a general electromagnetic clutch having no magnetic part in the related art, FIG. 5 is a Comparative Example 2 showing an electromagnetic clutch in which a magnetic part covers up to an upper region of a field coil, and FIG. 6 is Example 1 showing magnetic flux saturation of an electromagnetic clutch to which the field core unit for the electromagnetic clutch according to embodiments of the present disclosure is applied.

As can be seen from FIGS. 4 to 6, magnetic flux saturation increases as brightness increases. In comparison with Comparative Example 1 showing the general electromagnetic clutch in the related art, in Comparative Example 2 showing the electromagnetic clutch in which the magnetic part 200 is filled up to an upper region of the field core 300, it can be seen that although magnetic flux generated in the field coil 100 has to flow toward the disc 50 to generate an attractive force between the pulley 20 and the disc 50, the amount of leakage flux is increased and thus the attractive force is decreased.

On the other hand, in the electromagnetic clutch of Example 1 (FIG. 6), it can be seen that the amount of leakage flux is minimized in the entire region and thus an occurrence range of magnetic flux saturation is decreased.

Herein, as a result of measuring attractive forces of the electromagnetic clutches of Example 1 according to the present disclosure and Comparative Examples 1 and 2, it can be seen that while an attractive force of Comparative Example 1 was 1,765 N and an attractive force of Comparative Example 2 was 1,147 N, an attractive force of Example 1 was 2,823 N which is about 60% higher than that of the general electromagnetic clutch in the related art. The attractive measures for Comparative Examples 1 and 2 (FIGS. 4 and 5) and Example 1 (FIG. 6) were measured by the using a Computer-Assisted Engineering (CAE) simulation program. References herein to an attractive force of an electromagnetic clutch is an attractive force as determined by such protocol of Example 1. Other known methods for measuring attractive forces of an electromagnetic clutch also can be employed.

In preferred aspects, an electromagnetic clutch as disclosed herein will exhibit an attractive force of at least 2000 N as measured by the procedure of Example 1 as specified above. In particularly preferred aspects, an electromagnetic clutch as disclosed herein will exhibit an attractive force of at least 2100 N, 2200 N, 2300 N, 2400 N, 2500 N, 2600 N, or 2700 N or at least 2800 N as measured by the procedure of Example 1 as specified above.

Thus, the magnetic part 200 according to embodiments of the present disclosure may be configured such that the magnetic paste is limited to be filled in the interior space 310 of the field core 300 at a height less than or equal to the upper surface of the field coil 100.

More preferably, the magnetic part 200 according to embodiments of the present disclosure is configured such that a filling rate of the magnetic paste gradually increases in a downward direction.

This is because magnetic flux saturation occurs early mainly in a lower region of the field core 300, so that a filling amount of the magnetic paste must be increased such that the rate of flow of magnetic flux is increased in the region where magnetic flux saturation occurs early.

Figure 7:
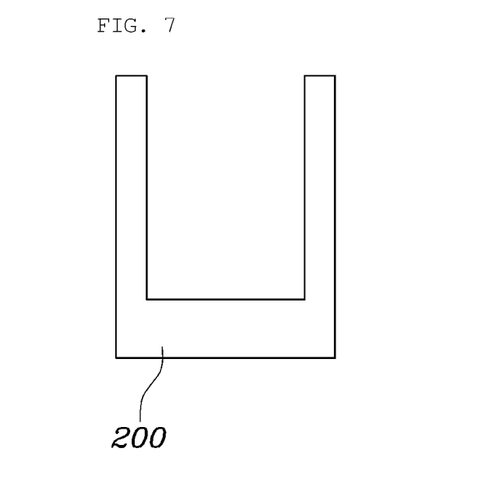
FIGS. 7 to 9 are views showing a magnetic part according to various embodiments of the present disclosure.
Figure 8:
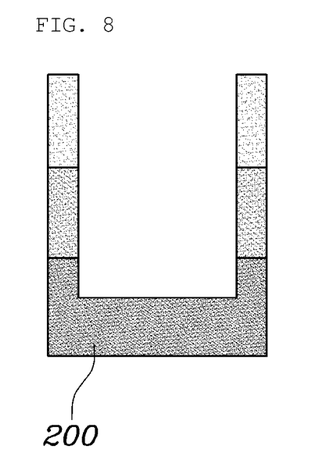
Figure 9:
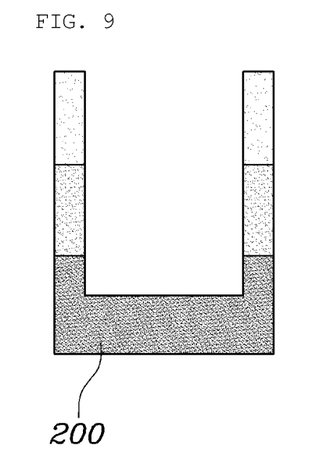

FIGS. 7 to 9 are views showing a magnetic part according to various embodiments of the present disclosure. FIG. 7 shows Example 1 in which the magnetic part has a uniform filling rate of 90% in the entire region, FIG. 8 shows Example 2 in which the magnetic part is divided into three regions in a height (e.g. downward) direction thereof, a filling rate in an upper region being 90%, a filling rate in a central region being 94%, and a filling rate in a lower region being 98% (max filling), and FIG. 9 shows Example 3 in which a filling rate in an upper region being 82%, a filling rate in a central region being 90%, and a filling rate in a lower region being 98%.

In Examples 2 and 3 in which the filling rate in the lower region is large, rate of flow of magnetic flux is increased in the lower region where magnetic flux saturation occurs early as compared with Example 1, whereby in the lower region of the magnetic part 200, a region where magnetic flux saturation occurs is minimized, thus reducing power consumption and increasing an attractive force of the field core unit for the electromagnetic clutch.

The field coil 100 according to embodiments of the present disclosure may be formed in a donut-like shape structured such that a cross-sectional area thereof gradually reduces in a downward direction. This is because, as described above, magnetic flux saturation occurs early mainly in the lower region of the field core 300, so that a space in which the magnetic paste is filled has to be increased such that rate of flow of magnetic flux is increased in the region where magnetic flux saturation occurs early.

More preferably, the field coil 100 is configured such that an inner diameter thereof gradually increases in the height (e.g. downward) direction, while an outer diameter thereof remains constant in the height (e.g. downward) direction.

This is because an inner diameter side-lower region of the field core 300 is the region where magnetic flux saturation occurs early mainly, so that by increasing the filling amount of the magnetic paste, magnetic flux is allowed to flow in the lower region of the field core 300 in the inner diameter direction, thus minimizing the region where magnetic flux saturation occurs.

FIGS. 10 to 13 are views showing magnetic flux saturation according to a shape of a field coil according to various embodiments of the present disclosure.

Figure 10:
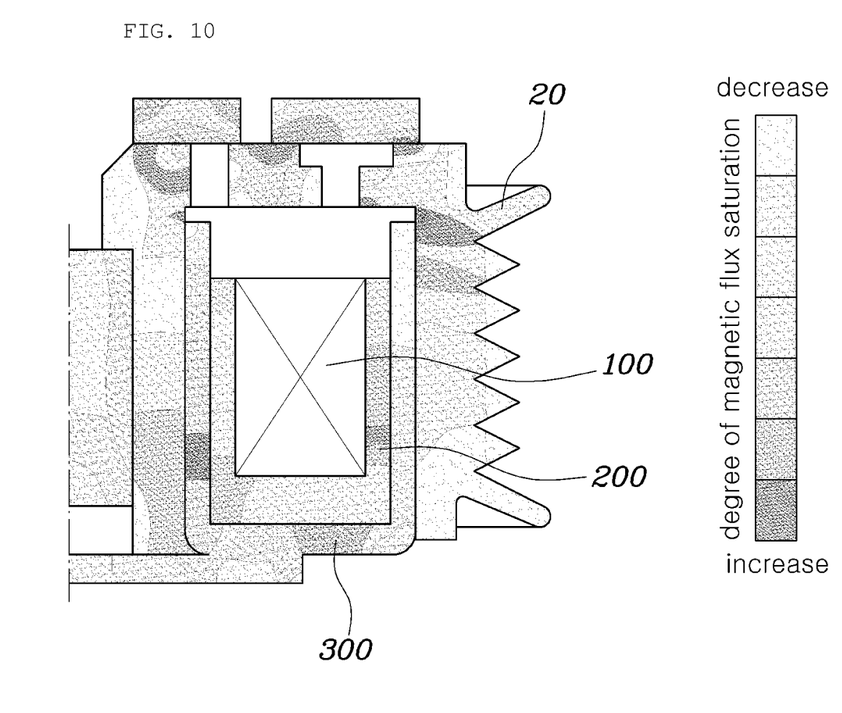
FIGS. 10 to 13 are views showing magnetic flux saturation according to a shape of a field coil according to various embodiments of the present disclosure.
Figure 11:
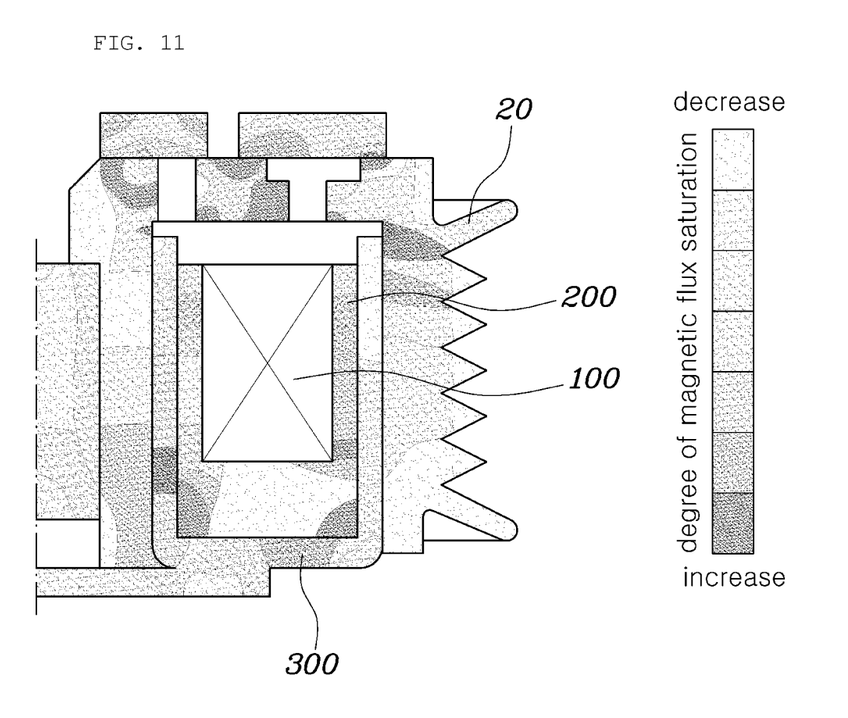
Figure 12:
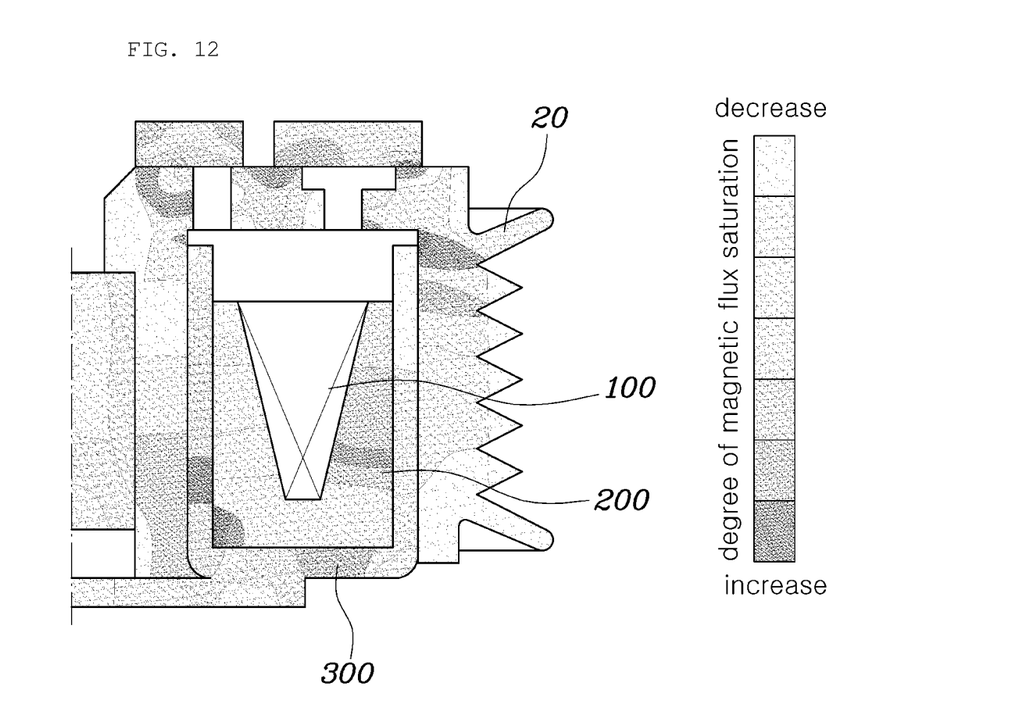
Figure 13:
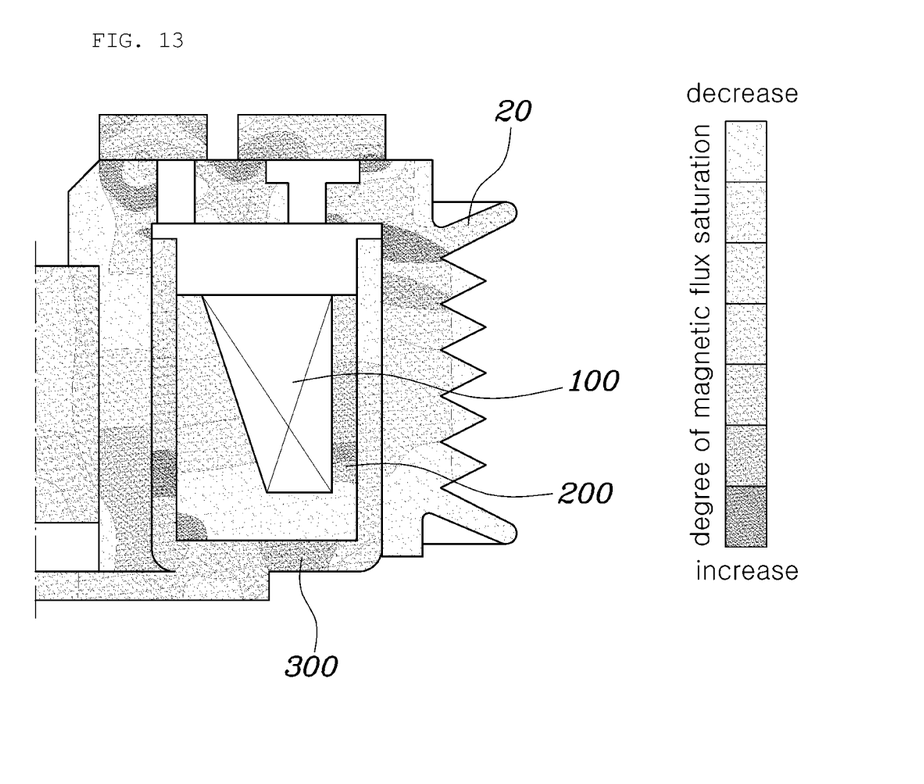

FIG. 10 is Example 1, FIG. 11 is Example 4 in which the field coil is moved upward, FIG. 12 is Example 5 in which the filling amount of the magnetic paste is increased in inner and outer diameter side-lower regions of the field core, and FIG. 13 is Example 6 in which the filling amount of the magnetic paste is increased in the inner diameter side-lower region of the field core.

As can be seen from FIGS. 10 to 13, by increasing the filling amount of the magnetic paste filled in the lower region of the field core 300 where the magnetic flux saturation occurs early, a flow path of magnetic flux is increased, thus reducing the region where the magnetic flux saturation occurs.

In particular, in the case of Example 6 in which the filling amount of magnetic paste filled in the inner diameter side-lower region of the field core 300 where magnetic flux saturation occurs early is increased, it can be seen that the region where the magnetic flux saturation occurs is minimized, thus increasing an attractive force of the field core unit for the electromagnetic clutch.

More preferably, the field core unit for the electromagnetic clutch according to embodiments of the present disclosure further includes a molded part 400 inserted into the interior space 310 of the field core 300 so as to encompass and fix an upper portion of the field coil 100.

Accordingly, the molded part 400 allows the field coil 100 and the magnetic part 200 that are inserted in the interior space 310 of the field core 300 are fixed again thereby, so that durability and lifespan of the field core unit for the electromagnetic clutch can be improved.

Herein, the molded part 400 may be made of a resin such as epoxy or a composite material such as bulk molded compound (BMC) or fiber-reinforced plastic (FRP), which is because it can block flow of magnetic flux while enabling weight reduction. Thus, it is possible to prevent leakage flux while minimizing any weight increase, thereby improving performance of the manufactured field core unit for the electromagnetic clutch.

Although certain embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A field core unit for an electromagnetic clutch, the field core unit comprising:
   a field coil generating a magnetic flux;
   a magnetic part provided with an annular-shaped insertion groove encompassing lower and side portions of the field coil such that the magnetic flux flows through the magnetic part;
   a field core configured such that an upper surface thereof is open and an interior space is formed therein; and
   a molded part inserted into the interior space of the field core so as to encompass and fix an upper portion of the field coil,
   wherein the magnetic part is inserted into the interior space of the field core,
   wherein the magnetic part is formed by molding a magnetic paste such that the magnetic flux flows through the magnetic part, the magnetic paste obtained by mixing iron-based metal powder and epoxy,
   wherein the iron-based metal powder is present in an amount of 70 weight % or greater based on total weight of the magnetic paste, and
   wherein the magnetic part is formed such that a filling rate of the magnetic paste increases in a downward direction.

2. The field core unit of claim 1, wherein the field coil is configured such that a cross-sectional area thereof reduces in a downward direction.

3. The field core unit of claim 2, wherein the field coil is further configured such that an inner diameter thereof increases in a downward direction, while an outer diameter thereof remains constant in the downward direction.

4. The field core unit of claim 1, wherein the magnetic part is configured such that an upper surface thereof is located lower than or on the same plane as an upper surface of the field coil.

5. The field core unit of claim 1, wherein the molded part is made of a resin or a fiber-reinforced plastic.

6. The field core unit of claim 1 wherein the field core has a cylindrical shape.

7. The field core unit of claim 1 wherein the field core has a polygonal shape.

8. An electromagnetic clutch comprising the field core unit of claim 1.

9. The electromagnetic clutch of claim 8 wherein the clutch exhibits an attractive force of at least 2000 N.

10. A vehicle which comprises the electromagnetic clutch of claim 8.

11. The field core unit of claim 1 wherein the molded part is positioned above the magnetic part.

12. The field core unit of claim 1 wherein the molded part abuts the magnetic part.

13. The field core unit of claim 1 wherein the molded part allows the field coil and the magnetic part to closely contract each other.

* * * * *